United States Patent
Oda et al.

(10) Patent No.: US 10,230,462 B2
(45) Date of Patent: Mar. 12, 2019

(54) OPTICAL TRANSMISSION CHARACTERISTIC MEASUREMENT DEVICE AND METHOD

(71) Applicant: FUJITSU LIMITED, Kawasaki-shi, Kanagawa (JP)

(72) Inventors: Shoichiro Oda, Fuchu (JP); Toru Katagiri, Kawasaki (JP); Satoru Okano, Yokohama (JP); Masatake Miyabe, Kawasaki (JP); Yasuhiko Aoki, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/807,768

(22) Filed: Nov. 9, 2017

(65) Prior Publication Data

US 2018/0145747 A1    May 24, 2018

(30) Foreign Application Priority Data

Nov. 24, 2016  (JP) ................................. 2016-228394

(51) Int. Cl.
| H04B 10/07 | (2013.01) |
| H04B 17/00 | (2015.01) |
| H04B 10/079 | (2013.01) |
| H04B 10/564 | (2013.01) |
| H04J 14/02 | (2006.01) |

(52) U.S. Cl.
CPC ..... *H04B 10/07953* (2013.01); *H04B 10/564* (2013.01); *H04J 14/0221* (2013.01)

(58) Field of Classification Search
CPC ............. H04B 10/07953; H04B 10/564; H04J 14/0221
USPC .......................................... 398/9, 25, 26, 27
See application file for complete search history.

(56) References Cited

U.S. PATENT DOCUMENTS

| 7,522,846 B1 * | 4/2009 | Lewis .............. H04B 10/07955 398/195 |
| 2002/0048062 A1 * | 4/2002 | Sakamoto .......... H04B 10/0775 398/30 |
| 2014/0341595 A1 | 11/2014 | Harley et al. |

FOREIGN PATENT DOCUMENTS

| JP | 11-230857 | 8/1999 |
| JP | 2007-82086 | 3/2007 |

* cited by examiner

*Primary Examiner* — Tesfaldet Bocure
(74) *Attorney, Agent, or Firm* — Fujitsu Patent Center

(57) ABSTRACT

An optical transmission characteristic measurement method includes starting transmission of an optical signal from a transmitting node to a receiving node; receiving a bit error rate value measured by the receiving node and relates to the optical signal; determining whether the bit error rate value is higher than a given threshold; adjusting input power of the optical signal to lower until it is determined that the bit error rate value is higher than the given threshold when it is determined that the bit error rate value is not higher than the given threshold; estimating an optical signal to noise ratio from the bit error rate value when it is determined that the bit error rate value is higher than the given threshold; and calculating an optical signal to noise ratio based on the estimated optical signal to noise ratio and an amount of lowering of the input power.

14 Claims, 17 Drawing Sheets

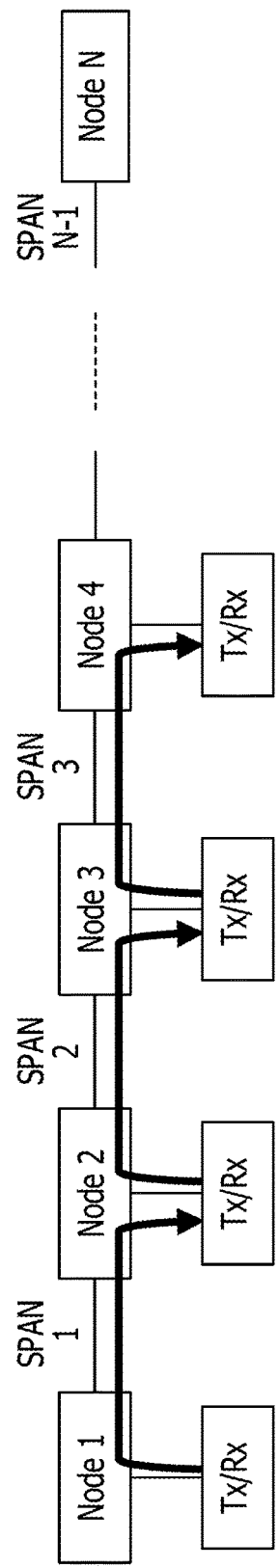

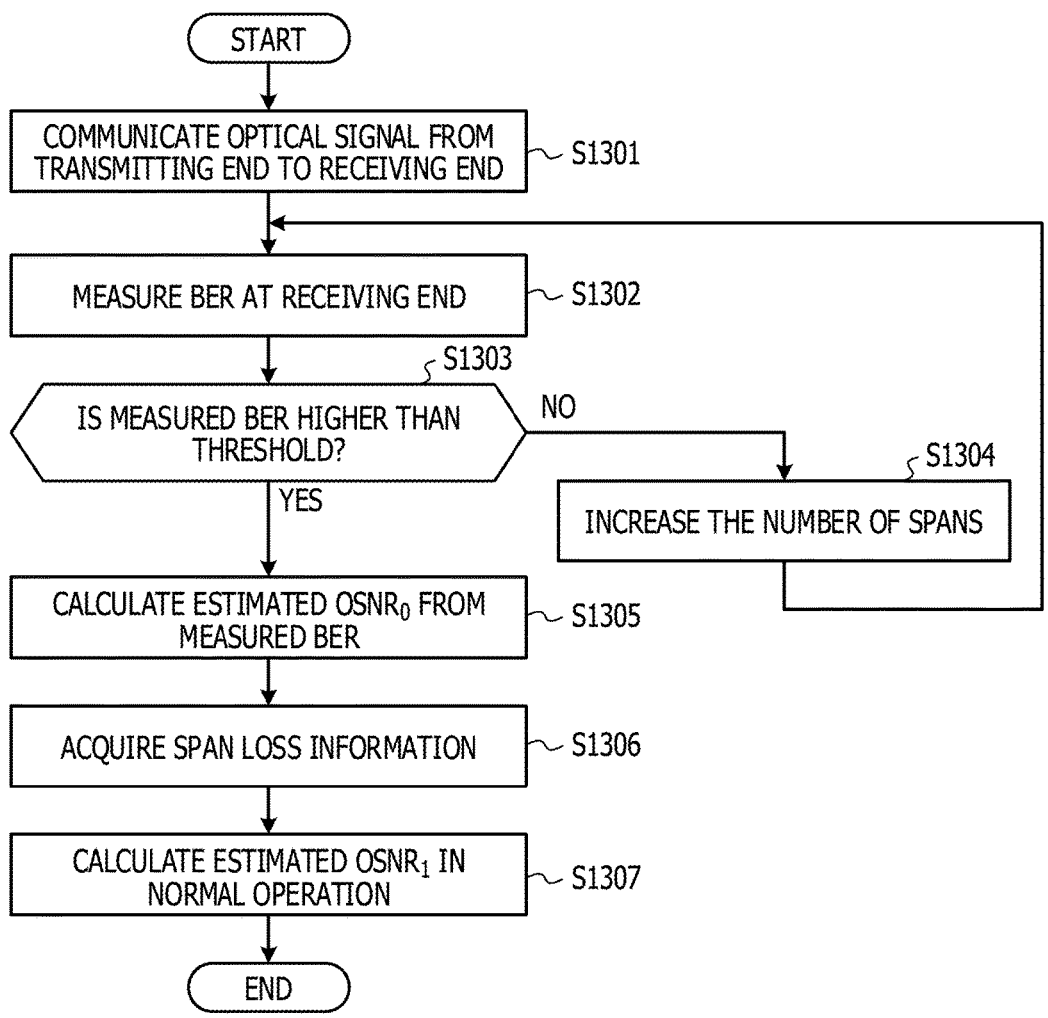

OPTICAL TRANSMISSION CHARACTERISTIC MEASUREMENT DEVICE AND METHOD

CROSS-REFERENCE TO RELATED APPLICATION

This application is based upon and claims the benefit of priority of the prior Japanese Patent Application No. 2016-228394, filed on Nov. 24, 2016, the entire contents of which are incorporated herein by reference.

FIELD

The embodiments discussed herein are related to an optical transmission characteristic measurement device and a method in an optical network.

BACKGROUND

In present optical communication system design, a method of preliminary design is employed in which design is carried out before communication services are offered based on information on system conditions that are given in advance, for example, fiber parameter, signal modulation format, bit rate, fiber input light power, or the like. In this case, it is difficult to measure actual parameters and therefore normally values defined in consideration of a margin of specifications are used for the design.

However, it is difficult to estimate an appropriate margin. Depending on the case, there is a problem that, although the actual performance is better, worse design values than the actual performance are output and the transmittable distance becomes shorter due to setting of an excessive margin. In recent years, requests for the optical communication system to have longer distance and higher capacity have been strong and such a problem becomes an issue.

Thus, there is the following technique. While the signal-to-noise ratio (SNR) is adjusted on the generating side of signal light, the output light thereof is transmitted by an optical transmission line. Then, a quality indicator based on the SNR and the bit error rate (BER) of the signal light output from the optical transmission line is measured and the degree of margin in normal operation is measured (for example, Japanese Laid-open Patent Publication No. 11-230857).

Moreover, there is a technique in which the optimum route is selected based on a total optical signal-to-noise ratio (OSNR) index value calculated for each of routes from an optical node at the starting point to an optical node at the ending point by using an OSNR index value calculated based on the OSNR of the transmission paths between the respective optical nodes (for example, Japanese Laid-open Patent Publication No. 2007-82086).

Here, the SNR or OSNR is the optical signal to noise ratio. The BER is the bit error rate.

According to the above-described related art, the degree of margin in normal operation may be calculated based on the measurement result of the SNR when the BER is somewhat high. However, it is difficult to accurately estimate the SNR when the BER in normal operation is low directly because the measurement error in a line card that is an optical transmitter/receiver is large.

Also in the related art in which the OSNR in the whole route is calculated based on the OSNR of the transmission paths between the respective optical nodes, the measurement error is large again regarding the OSNR when the BER of the transmission path between the optical nodes is low. Thus, the OSNR in the whole route is also difficult to accurately estimate. In view of the above, it is desirable that the transmission quality may be accurately measured irrespective of variation in characteristics of the optical transmission device.

SUMMARY

According to an aspect of the embodiments, an optical transmission characteristic measurement method executed by a processor included in an optical transmission characteristic measurement device coupled to a plurality of nodes, the optical transmission characteristic measurement method includes starting transmission of an optical signal from a transmitting node to a receiving node in the plurality of nodes; receiving a bit error rate value that is measured by the receiving node and relates to the optical signal; determining whether the bit error rate value is higher than a given threshold; adjusting input power of the optical signal to lower the input power until it is determined that the bit error rate value is higher than the given threshold when it is determined that the bit error rate value is not higher than the given threshold; estimating an optical signal to noise ratio from the bit error rate value when it is determined that the bit error rate value is higher than the given threshold; and calculating an optical signal to noise ratio based on the estimated optical signal to noise ratio and an amount of lowering of the input power.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 is a diagram illustrating one example of a first technique for determining transmission propriety of an optical wavelength path in an embodiment;

FIG. 13 is a flowchart illustrating a processing example of the second embodiment;

DESCRIPTION OF EMBODIMENTS

Figure 2A:
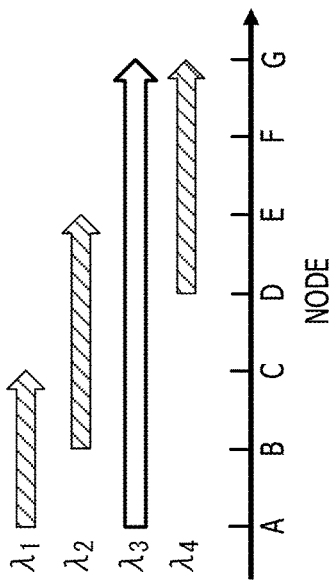
FIG. 2A and FIG. 2B are diagrams illustrating one example of a second technique for determining transmission propriety of an optical wavelength path in the present embodiment.

The embodiments will be described in detail below with reference to the drawings. FIG. 1 is a diagram illustrating one example of a first technique for determining transmission propriety of an optical wavelength path in an embodiment. Nodes from Node 1 to Node N are each an optical transmission device. To each node, an optical transmitting device Tx and an optical receiving device Rx are coupled. Now the respective transmission sections between Node 1 and Node 2, between Node 2 and Node 3, and between Node 3 and Node 4 are defined as spans 1, 2, and 3. The subsequent spans are also similarly defined up to span N-1 of the transmission section between Node N-1 and Node N. In the optical transmission system in the present embodiment, information obtained by calculation of an estimated OSNR from the BER of each individual span of spans 1, 2, 3, . . . is turned to a database. Furthermore, in the actual transmission path, the estimated OSNRs turned to the database corresponding to the respective spans are added and thereby the estimated OSNR of the whole of the requested optical wavelength path is calculated. Moreover, by inverse calculation from the estimated OSNR, the BER of the whole of the requested optical wavelength path is calculated.

For example, before communications are started, a value F that represents the transmission quality of each span is calculated in advance from the BER measured for each individual span of spans 1, 2, 3, . . . on the network based on expression 1 represented below. The expression 1 represents the case in a dual-polarization quadrature phase shift keying (DP-QPSK) system as an optical communication system, for example. Bn represents the noise bandwidth and Rs represents the signal baud rate. erfc represents a complementary error function.

$$F = (\text{erfc}^{-1}(2BER))^2 \cdot \frac{2Rs}{Bn} \qquad \text{[Expression 1]}$$

The above-described expression 1 is a theoretical expression that links the BER and the OSNR and the value F representing the transmission quality is the OSNR in terms of the theoretical expression. However, the OSNR deviates from the theoretical expression in practice. Therefore, F does not correspond with the OSNR and is what is equivalent to the OSNR, to be exact. Hereinafter, F will be referred to as "estimated OSNR" or "estimated OSNR value." Because F is what is equivalent to the OSNR as above, an estimated OSNR value $F_{1->4}$ of the optical wavelength path from Node 1 to Node 4 in FIG. 1 may be calculated as represented by the following expression 2.

$$F_{1->4} = (F_1^{-1} + F_2^{-1} + F_3^{-1})^{-1} \qquad \text{[Expression 2]}$$

Therefore, from expression 1, $BER_{1->4}$ of the optical wavelength path from Node 1 to Node 4 may be calculated by the following expression 3, and determination of the transmission propriety of the optical wavelength path from Node 1 to Node 4 is carried out based on this value.

$$BER_{1->4} = \frac{1}{2}\text{erfc}\left(\sqrt{\frac{F_{1->4} \cdot Bn}{2Rs}}\right) \qquad \text{[Expression 3]}$$

Figure 2B:
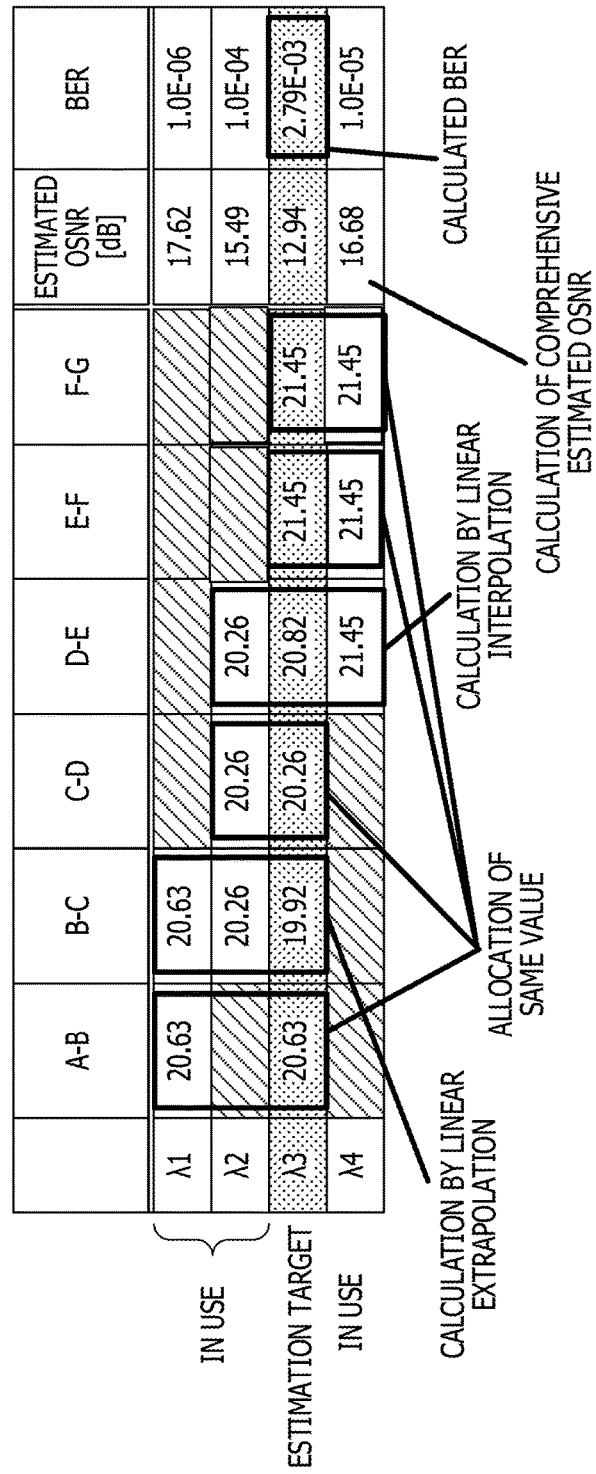

FIG. 2A and FIG. 2B are diagrams illustrating one example of a second technique for determining transmission propriety of an optical wavelength path in the present embodiment. Suppose that, as illustrated in FIG. 2A, an optical wavelength path from node A to node C is in use regarding an optical wavelength λ1 and an optical wavelength path from node B to node E is in use regarding an optical wavelength λ2 and an optical wavelength path from node D to node G is in use regarding an optical wavelength λ4, for example.

Furthermore, suppose that, as represented in FIG. 2B, the value of the BER is calculated as 1.0E-06 ("E" represents an exponential function) regarding the optical wavelength path from node A to node C about the optical wavelength λ1. Moreover, suppose that the estimated OSNR value "dB" corresponding to the BER value is calculated as 17.62 by the above-described expression 1 or the like as represented in FIG. 2B. In this case, estimated OSNR value F=20.63 resulting from uniform allocation of estimated OSNR value F=17.62 is individually set for spans A-B and B-C forming the optical wavelength path. Setting is similarly carried out also regarding the optical wavelength path from node B to node E about the optical wavelength λ2. For example, with BER=1.0E-04 and estimated OSNR value=15.49, estimated OSNR value F=20.26 is individually uniformly allocated to spans B-C, C-D, and D-E. Setting is similarly carried out also regarding the optical wavelength path from node D to node G about the optical wavelength λ4. For example, with BER=1.0E-05 and estimated OSNR value=16.68, estimated OSNR value F=21.45 is individually uniformly allocated to spans D-E, E-F, and F-G.

From these set values, regarding the optical wavelength path from node A to node G about the optical wavelength λ3, for spans A-B, C-D, E-F, and F-G, the same estimated OSNR value as the estimated OSNR value of another optical wavelength path set about a respective one of the sections is allocated. Regarding span B-C, the estimated OSNR value is calculated and set by linear extrapolation from the set value of the optical wavelength λ1 and the set value of the optical wavelength λ2. Moreover, regarding span D-E, the estimated OSNR value is calculated and set by linear interpolation from the set value of the optical wavelength λ2 and the set value of the optical wavelength λ4.

After the estimated OSNR value of each span about the optical wavelength λ3 is set in this manner, estimated OSNR value F=12.94 over the whole of the optical wavelength path from node A to node G about the optical wavelength λ3 is calculated and set by the above-described expression 2. Moreover, by using this estimated OSNR value, BER=2.79E-03 over the whole of the optical wavelength path from node A to node G about the optical wavelength λ3 is calculated by the above-described expression 3. Furthermore, based on this BER value, the transmission propriety of the optical wavelength path from node A to node G about the optical wavelength λ3 is determined.

Figure 3:
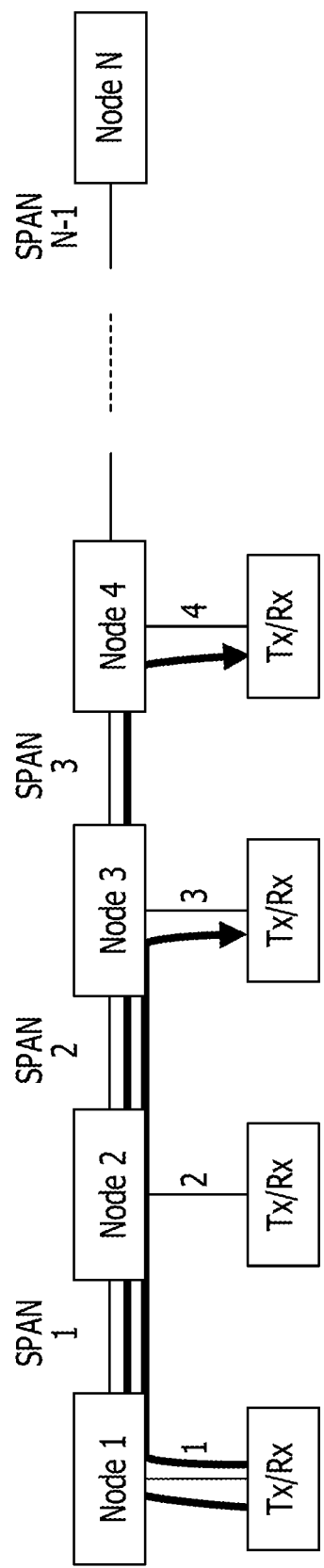
FIG. 3 is a diagram illustrating one example of a third technique for determining transmission propriety of an optical wavelength path in the present embodiment.

FIG. 3 is a diagram illustrating one example of a third technique for determining transmission propriety of an optical wavelength path in the present embodiment. In the above-described FIG. 1, from the estimated OSNR value of each span forming an optical wavelength path, the estimated OSNR value of the whole optical wavelength path is calculated by expression 2. Moreover, the BER of the whole optical wavelength path is calculated from the calculated estimated OSNR value by expression 3. Here, with a longer span, the difference between the estimated OSNR value calculated based on the technique of FIG. 1 and the actual estimated OSNR value becomes larger due to the influence of nonlinear characteristics of the optical fiber.

Thus, in the third technique, from the difference in the amount of transmission quality between plural spans including the span of the calculation target and spans (one span or more) that do not include the span of the calculation target, the estimated OSNR value F of the target span is calculated.

In the example of FIG. 3, as the estimated OSNR value of the path of the plural spans including the span of the calculation target, the BER ($BER_{1-4}$) of the path from Node 1 to Node 4 is measured and an estimated OSNR value $F_{1-4}$ is calculated based on the following expression 4 corresponding to the above-described expression 1.

$$F_{1-4} = (\text{erfc}^{-1}(2BER_{1-4}))^2 \cdot \frac{2Rs}{Bn} \qquad \text{[Expression 4]}$$

Similarly, as the estimated OSNR value of the path that does not include the span of the calculation target, the BER ($BER_{1-3}$) of the path from Node 1 to Node 3 is measured and an estimated OSNR value $F_{1-3}$ is calculated.

Then, from $F_{1-4}$ and $F_{1-3}$, an estimated OSNR value $F_{3-4}$ of span 3 of the calculation target is calculated by the following expression 5 obtained by transforming the above-described expression 2.

$$F_3 = (F_{1-4}^{-1} - F_{1-3}^{-1})^{-1} \qquad \text{[Expression 5]}$$

In the above-described first, second, and third techniques for determining the transmission propriety of an optical wavelength path, the estimated OSNR value F is estimated from a measured BER regarding one or plural spans basically.

Here, there is the case in which a line card that is one example of a transmitter/receiver that measures the transmission quality of a network in advance and a line card used for actual services are physically different. At this time, characteristics of the line card involve variation on each individual basis. For example, when the BER is low (estimated OSNR value is high), the characteristic variation depending on characteristics of the line card becomes large because the influence of amplified spontaneous emission (ASE) noise is small. On the other hand, when the BER is high (estimated OSNR value F is low), the influence of the ASE noise becomes dominant and the above-described variation becomes small.

Figure 4:
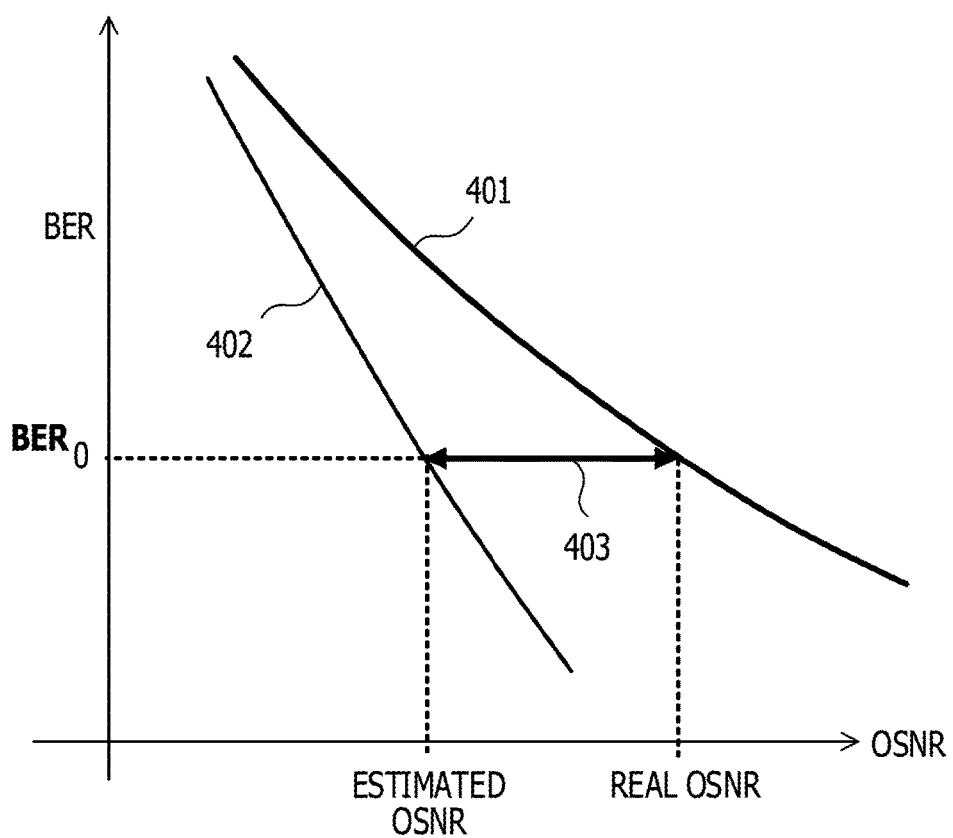
FIG. 4 is a diagram for explaining that a line card characteristic and a theoretical curve are divergent.

Now, a consideration will be made about calculating the estimated OSNR value F from the BER measured after transmission through a certain span. FIG. 4 is a diagram for explaining that a line card characteristic and a theoretical curve are divergent. The OSNR after the transmission through the certain span is defined as the real OSNR. Because a line card characteristic 401 is unknown, it is difficult to measure the real OSNR on the real system and estimation of the real OSNR is the purpose. This real OSNR is defined as the OSNR in the operation state. As this time, if a measured BER is defined as BER0, the estimated OSNR value F may be calculated from the above-described expression 1. In FIG. 4, a theoretical curve 402 is a curve that represents the relationship between the estimated OSNR value and the BER based on expression 1 and the estimated OSNR value corresponding to measured BER=BER0 is calculated by the theoretical curve 402. However, as illustrated in FIG. 4, the line card used for the measurement has a characteristic like that represented by 401 in FIG. 4, for example, and the real OSNR is the value on the line card characteristic curve 401 corresponding to measured BER=BER0. Here, the BER after transmission through one span hardly deteriorates from the BER when transmission is not carried out. Thus, for example, the value of BER=BER0 measured in one span is a small value. As a result, it turns out that a large divergence width 403 exists between the estimated OSNR value and the real OSNR value when the value of measured BER=BER0 exists in a region of small values as illustrated in FIG. 4. The divergence width 403 (real OSNR-estimated OSNR) often extends into several decibels. The divergence width 403 is attributed to the fact that the theoretical curve 402 corresponding to expression 1 is defined without consideration of characteristics of the actual line card.

Figure 5A:
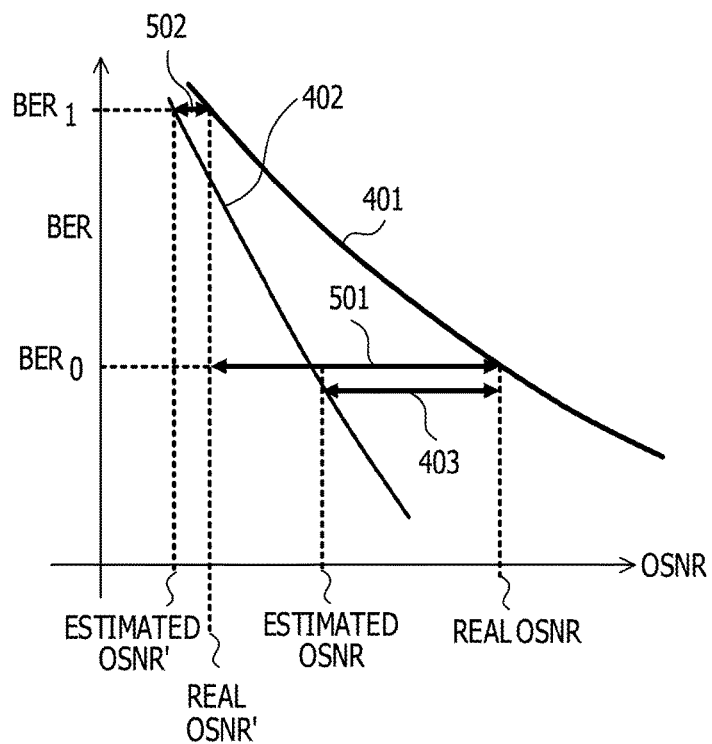
FIG. 5A and FIG. 5B are diagrams for explaining a calculation scheme of an estimated OSNR value according to the present embodiment.
Figure 5B:
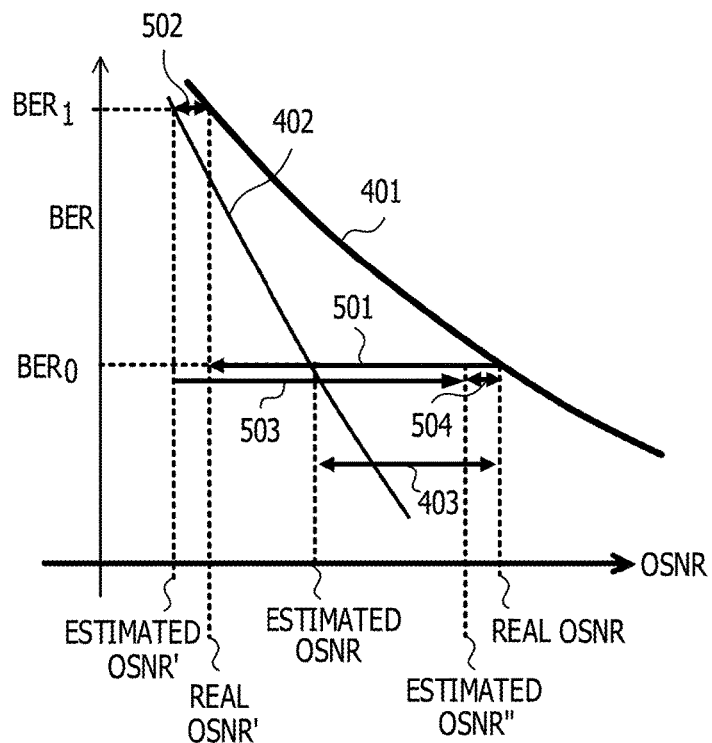

Thus, in the present embodiment, the estimated OSNR value with high accuracy is calculated by a scheme to be described below. FIG. 5A and FIG. 5B are diagrams for explaining a calculation scheme of an estimated OSNR value according to the present embodiment. First, as illustrated in FIG. 5A, the OSNR is deteriorated and the BER is made high. For example, the OSNR is deteriorated until the timing when the BER surpasses a given threshold. An OSNR deterioration amount 501 at this time is calculated. The OSNR resulting from the deterioration is defined as a real OSNR'. Because the line card characteristic 401 is unknown, it is difficult to measure the real OSNR' in the real system. The BER measured when the OSNR is deteriorated by the OSNR deterioration amount 501 is defined as BER1. The OSNR calculated based on the theoretical curve 402 (above-described expression 1) with this BER1 employed as input is defined as an estimated OSNR'. As is understood from FIG. 5A, it turns out that the line card characteristic 401 and the theoretical curve 402 are considerably close to each other in a region in which the BER is high. Therefore, it turns out that a difference 502 between the estimated OSNR' and the real OSNR' is small compared with the difference 403 between the real OSNR and the estimated OSNR. The above-described given threshold relating to the BER is set to a value in a region in which the line card characteristic 401 and the theoretical curve 402 are estimated to become sufficiently close to each other.

Next, as illustrated in FIG. 5B, an OSNR restoration amount 503 that is the same amount as the OSNR deterioration amount 501 is added to the estimated OSNR' and thereby an estimated OSNR" in real operation is calculated as the addition result. A difference 504 between the estimated OSNR" and the real OSNR at this time has a value corresponding to the difference 502 between the estimated OSNR' and the real OSNR'. Therefore, it becomes possible to estimate the estimated OSNR" in real operation with a characteristic close to the line card characteristic 401.

As described above, in the present embodiment, it becomes possible to calculate the OSNR value desired to be obtained by setting the OSNR (S/N) low to estimate an OSNR from a BER value measured in the upper left region in FIG. 5B, in which variation in the line card characteristic is small, by using the theoretical curve and then restoring (converting) the S/N.

Here, as a first embodiment to deteriorate the OSNR by the OSNR deterioration amount 501, a method is conceivable in which the input power of an optical signal is sequentially decreased from the input power value of the optical signal of the operation timing and thereby the input power is lowered by the same amount [dB] as the OSNR deterioration amount 501. As a second embodiment, a method in which the number of spans is sequentially increased until the BER measured at the receiving end surpasses the above-described given threshold is conceivable. As a third embodiment, a method obtained by combining the above-described first and second methods is conceivable. Moreover, as a fourth embodiment, a method in which noise is added to the receiving end is conceivable. Each of the first to fourth embodiments will be sequentially described below.

Figure 6:
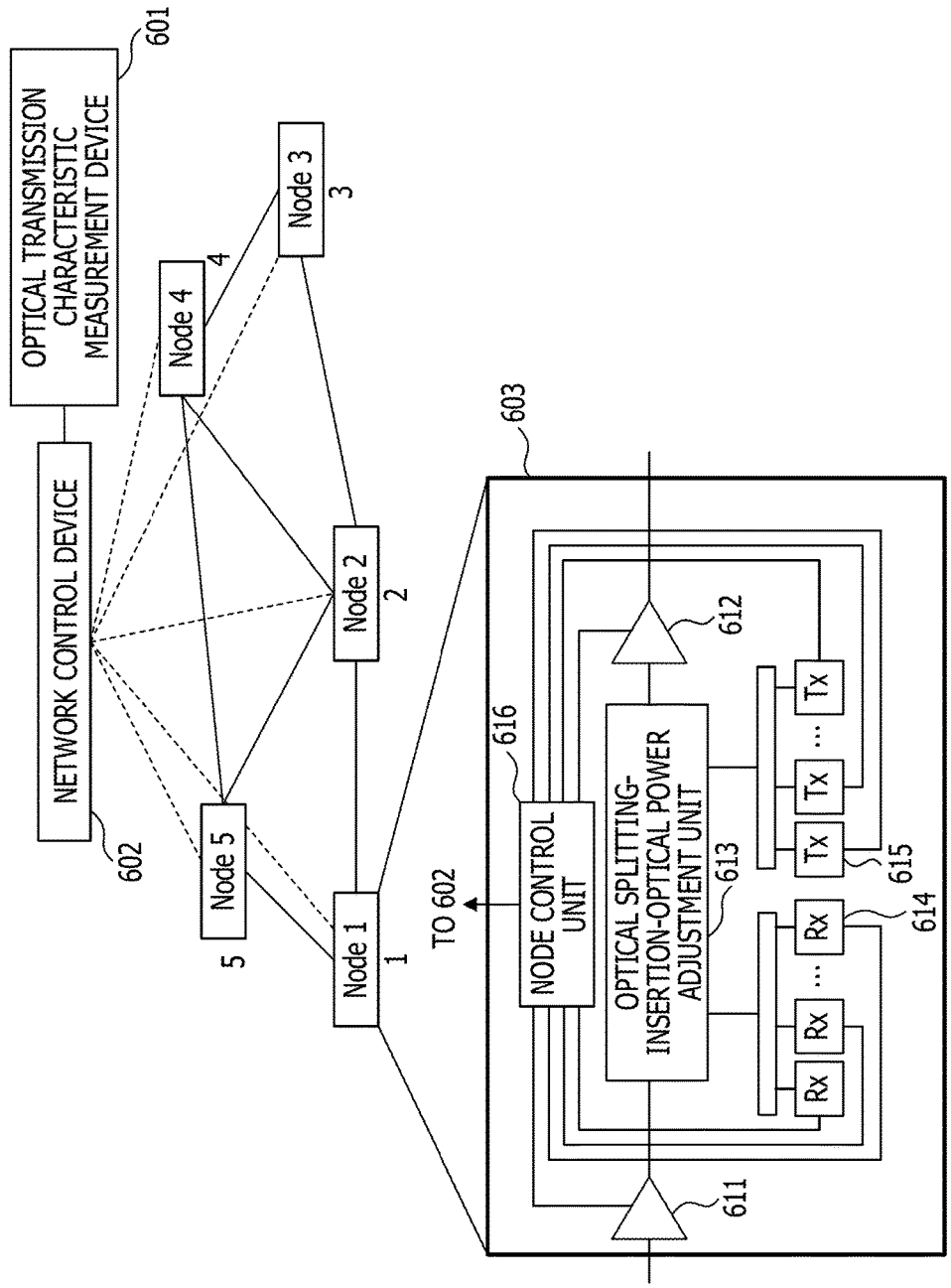
FIG. 6 is a diagram illustrating a configuration example of a whole system of the present embodiment common to first to fourth embodiments.

FIG. 6 is a diagram illustrating a configuration example of a whole system of the present embodiment common to first to fourth embodiments.

Nodes 603 that form Node 1 to Node 5 operate based on control from a network control device 602. To the network control device 602, an optical transmission characteristic measurement device 601 that carries out operation of the first to fourth embodiments based on the operation of FIG. 5A is coupled. The node 603 includes an input-side optical amplifier 611, an output-side optical amplifier 612, an optical splitting-insertion-optical power adjustment unit 613, an optical receiver 614, an optical transmitter 615, and a node control unit 616. An optical signal input from an optical fiber on the input side is amplified by the input-side optical amplifier 611. The amplified optical signal is split into the optical receiver 614 by the optical splitting-insertion-optical power adjustment unit 613 or is mixed with an optical signal from the optical transmitter 615 to be output to an optical fiber on the output side via the output-side optical amplifier 612. The node control unit 616 controls the optical receiver 614 and the optical transmitter 615 in accordance with an instruction from the network control device 602.

Figure 7:
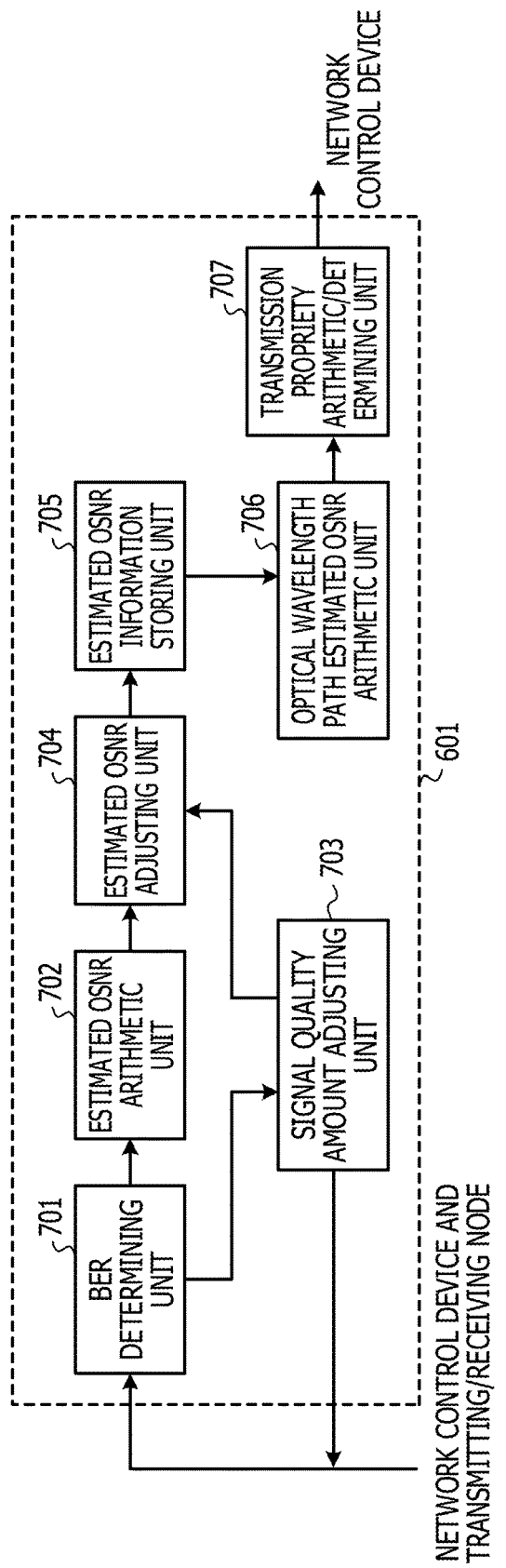
FIG. 7 is a block diagram of an optical transmission characteristic measurement device.

FIG. 7 is a block diagram of the optical transmission characteristic measurement device 601 in FIG. 6.

First, a BER determining unit 701 determines the BER based on a given threshold set in advance (refer to the description of FIG. 5A).

An estimated OSNR arithmetic unit 702 calculates the estimated OSNR (amount of transmission quality) of each span (fiber transmission section) included in an optical wavelength path represented by wavelength path information notified from the network control device 602 in FIG. 6 based on the wavelength path information, the BER, and error vector magnitude (EVM) information. The EVM is information that represents the degree of distribution of signal points and represents the degree of distribution of four phase points in the case of the DP-QPSK system. If the EVM is known and the BER is unknown, the BER may be approximately calculated from the EVM based on the following expression 6.

$$BER \approx \frac{(1-L^{-1})}{\log_2 L} \mathrm{erfc}\left[\sqrt{\frac{3\log_2 L}{(L^2-1)} \frac{\sqrt{2}}{(kEVM_m)^2 \log_2 M}}\right]$$ [Expression 6]

The above-described expression 6 is cited from the following document: Error Vector Magnitude as a Performance Measure for Advanced Modulation Formats, Rene Schmogrow, Bernd Nebendahl, Marcus Winter, Arne Josten, David Hillerkuss, Swen Koenig, Joachim Meyer, Michael Dreschmann, Michael Huebner, Christian Koos, Juergen Becker, Wolfgang Freude, and Juerg Leuthold, IEEE PHOTONICS TECHNOLOGY LETTERS, VOL. 24, NO. 1, JANUARY, 2012.

The estimated OSNR arithmetic unit 702 calculates the estimated OSNR' by the above-described expression 1 (theoretical curve 402 in FIG. 5A) based on BER=BER1 (see FIG. 5A) when the BER determining unit 701 carries out the determination based on the above-described given threshold. The estimated OSNR arithmetic unit 702 outputs the calculated estimated OSNR' together with the wavelength path information and span information.

A signal quality amount adjusting unit 703 decides the adjustment amount of OSNR corresponding to the OSNR deterioration amount 501 described above with FIG. 5A based on BER=BER1 (see FIG. 5A) when the BER determining unit 701 carries out the determination based on the above-described given threshold, and notifies the network control device 602 of the adjustment amount. The network control device 602 adjusts the optical signal so that the OSNR corresponding to this adjustment amount may be obtained. The adjustment item is the input power value of the optical signal in the first embodiment to be described later and is the number of spans in the optical wavelength path as the target in the second embodiment. The adjustment item is a combination of the first and second embodiments in the third embodiment and is noise added at the receiving end in the fourth embodiment.

An estimated OSNR adjusting unit 704 acquires adjustment information of the OSNR from the signal quality amount adjusting unit 703 and adjusts the value of the estimated OSNR based on the adjustment information. For example, as described above in the explanation of FIG. 5B, the estimated OSNR adjusting unit 704 adds the OSNR restoration amount 503 that is decided by the signal quality amount adjusting unit 703 as the adjustment amount and is the same amount as the OSNR deterioration amount 501 to the estimated OSNR' calculated by the estimated OSNR arithmetic unit 702. The estimated OSNR adjusting unit 704 calculates the estimated OSNR" in real operation as the addition result. The estimated OSNR adjusting unit 704 stores this estimated OSNR" in an estimated OSNR information storing unit 705 together with the span information in the wavelength path information output by the estimated OSNR arithmetic unit 702.

The estimated OSNR information storing unit 705 stores the estimated OSNR" in real operation regarding each span as the above-described database.

An optical wavelength path estimated OSNR arithmetic unit 706 calculates the estimated OSNR corresponding to an optical wavelength path requested from the network control device 602 based on the estimated OSNR" that is stored in the estimated OSNR information storing unit 705 and corresponds to the spans included in the optical wavelength path. The optical wavelength path estimated OSNR arithmetic unit 706 calculates the estimated OSNR of the whole optical wavelength path based on the above-described expression 2 in accordance with the scheme explained with the above-described FIG. 1, FIG. 2A, FIG. 2B, or FIG. 3.

A transmission propriety arithmetic/determining unit 707 calculates the BER of the whole optical wavelength path based on the above-described expression 3 based on the estimated OSNR of the whole optical wavelength path calculated by the optical wavelength path estimated OSNR arithmetic unit 706. Then, the transmission propriety arithmetic/determining unit 707 determines the transmission propriety of the requested optical wavelength path by comparing the value of the calculated BER of the whole optical wavelength path with a threshold specified in advance from the network control device 602 regarding the requested optical wavelength path. The transmission propriety arithmetic/determining unit 707 notifies the network control device 602 of the result of the determination of the transmission propriety of the requested optical wavelength path.

Figure 8:
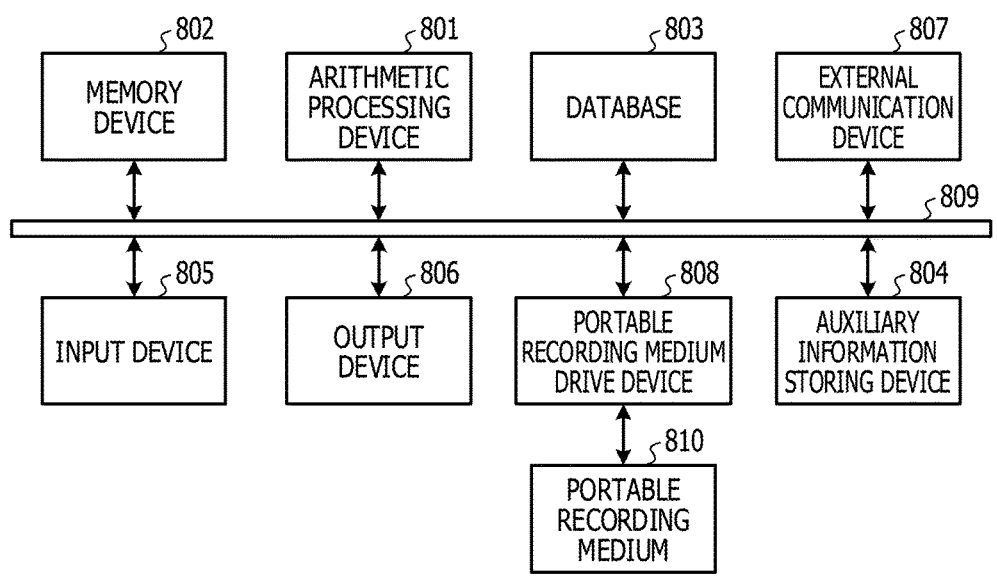
FIG. 8 is a diagram illustrating a hardware configuration example of a computer that implements an optical transmission characteristic measurement device as software processing.

FIG. 8 is a diagram illustrating a hardware configuration example of a computer that implements the optical transmission characteristic measurement device 601 in FIG. 6 having the configuration of FIG. 7 as software processing.

The computer illustrated in FIG. 8 includes an arithmetic processing device 801, a memory device 802, a database 803, an auxiliary information storing device 804, an input device 805, an output device 806, an external communication device 807, and a portable recording medium drive device 808 in which a portable recording medium 810 is inserted. These respective devices are mutually coupled by a bus 809. The configuration illustrated in FIG. 8 is one example of the computer that may implement the optical transmission characteristic measurement device 601 and such a computer is not limited to this configuration.

The arithmetic processing device 801 carries out control of the whole computer. The memory device 802 is a memory such as a random access memory (RAM) that temporarily stores a program or data stored in the auxiliary information storing device 804 (or the portable recording medium 810) in execution of the program, data update, or the like. The arithmetic processing device 801 carries out the overall control by reading out the program into the memory device 802 and executing the program.

The database 803 implements functions of the estimated OSNR information storing unit 705 in FIG. 7 as a database.

The external communication device 807 is a communication interface circuit that carries out communications with the network control device 602 in FIG. 6.

The input device 805 detects input operation by a user with a keyboard, a mouse, and so forth and notifies the arithmetic processing device 801 of the detection result. The output device 806 outputs data sent based on control by the arithmetic processing device 801 to a display device or a printing device.

The portable recording medium drive device 808 is a device that accommodates the portable recording medium 810 such as a synchronous dynamic random access memory (SDRAM), a CompactFlash (registered trademark), or an optical disc and has a role in supporting the auxiliary information storing device 804.

The optical transmission characteristic measurement device 601 according to the present embodiment is implemented through execution of a program equipped with functions of the respective blocks in FIG. 7 implemented by the respective flowcharts to be described later and so forth by the arithmetic processing device 801. The program may be recorded on the auxiliary information storing device 804 or the portable recording medium 810 to be distributed, for example, or may be allowed to be acquired from a network by the external communication device 807.

Figure 9A:
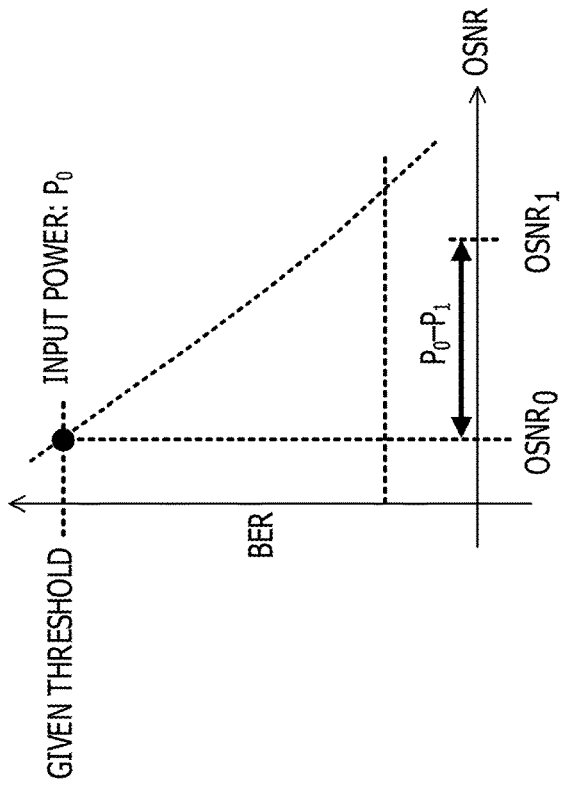
FIG. 9A and FIG. 9B are diagrams illustrating one example of the first embodiment.
Figure 9B:
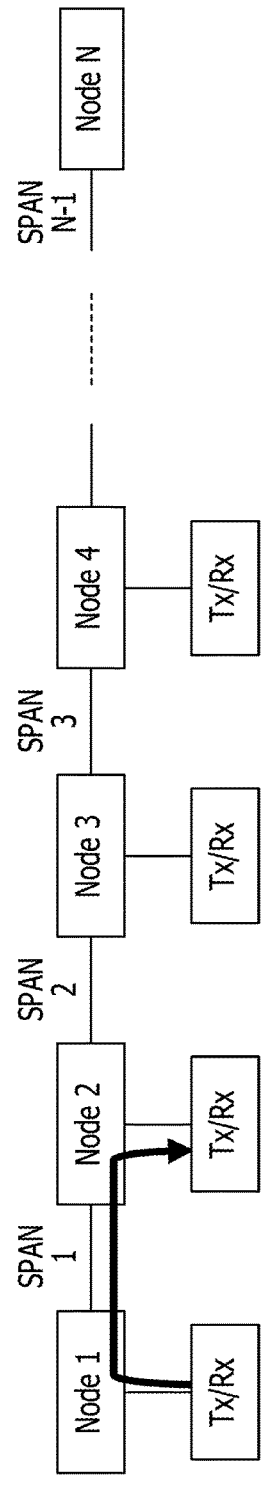

The first embodiment in the system having the above configuration of FIG. 6 to FIG. 8 will be described. As described above, the first embodiment is a method in which the input power of an optical signal is sequentially decreased from the input power value of the optical signal of the operation timing and thereby the input power is lowered by the same value [dB] as the OSNR deterioration amount 501 as the scheme for deteriorating the OSNR by the OSNR deterioration amount 501, described above in the explanation with FIG. 5A and FIG. 5B. FIG. 9A and FIG. 9B are diagrams illustrating one example of the first embodiment.

Now, calculating the estimated OSNR about span 1 from Node 1 to Node 2 will be assumed as exemplified in FIG. 9B. The signal power when the normal signal is operated (hereinafter, "in operation") is defined as P0. The procedure of the first embodiment is as follows.

Procedure 1: The reception BER is measured at Node 2 while the input power to span 1 is decreased. For example, an instruction is issued from the signal quality amount adjusting unit 703 in FIG. 7 to the network control device 602 and the node control unit 616 and the optical splitting-insertion-optical power adjustment unit 613 in the node 603 as Node 1 in FIG. 6. Thereby, the optical transmitter 615 corresponding to span 1 is instructed to transmit the optical signal with the input power that sequentially decreases. The network control device 602 in FIG. 6 causes the BER corresponding to the transmission with each input power described above to be sequentially measured at the optical receiver 614 corresponding to span 1 through the node control unit 616 in the node 603 as Node 2, and outputs the BER to the BER determining unit 701 in FIG. 7.

Procedure 2: As illustrated in FIG. 9A, at the timing when the BER determining unit 701 in FIG. 7 determines that the BER sequentially received from the network control device 602 has surpassed the given threshold, the BER determining unit 701 causes the signal quality amount adjusting unit 703 to stop the instruction to decrease the input power.

Procedure 3: The estimated OSNR arithmetic unit 702 in FIG. 7 calculates the estimated OSNR' (see FIG. 5A) corresponding to BER=BER0 at the above-described timing based on the above-described expression 1 and employs the estimated OSNR' as an estimated $OSNR_0$.

Procedure 4: The estimated OSNR adjusting unit 704 in FIG. 7 inputs the estimated $OSNR_0$ calculated by the estimated OSNR arithmetic unit 702 at the above-described timing, signal power P0 in operation, and input power P1 adjusted by the signal quality amount adjusting unit 703 at the above-described timing. Then, from these numerical values, the estimated OSNR adjusting unit 704 calculates an estimated $OSNR_1$ (corresponding to the estimated OSNR" in FIG. 5B) [dB] in operation by the following expression 7.

$$OSNR_1[dB]=OSNR_0+(P_0-P_1) \quad \text{[Expression 7]}$$

Instead of the comparison with the given threshold in the BER determining unit 701, a threshold may be set regarding the value resulting from the conversion from the BER to the estimated $OSNR_0$.

Figure 10:
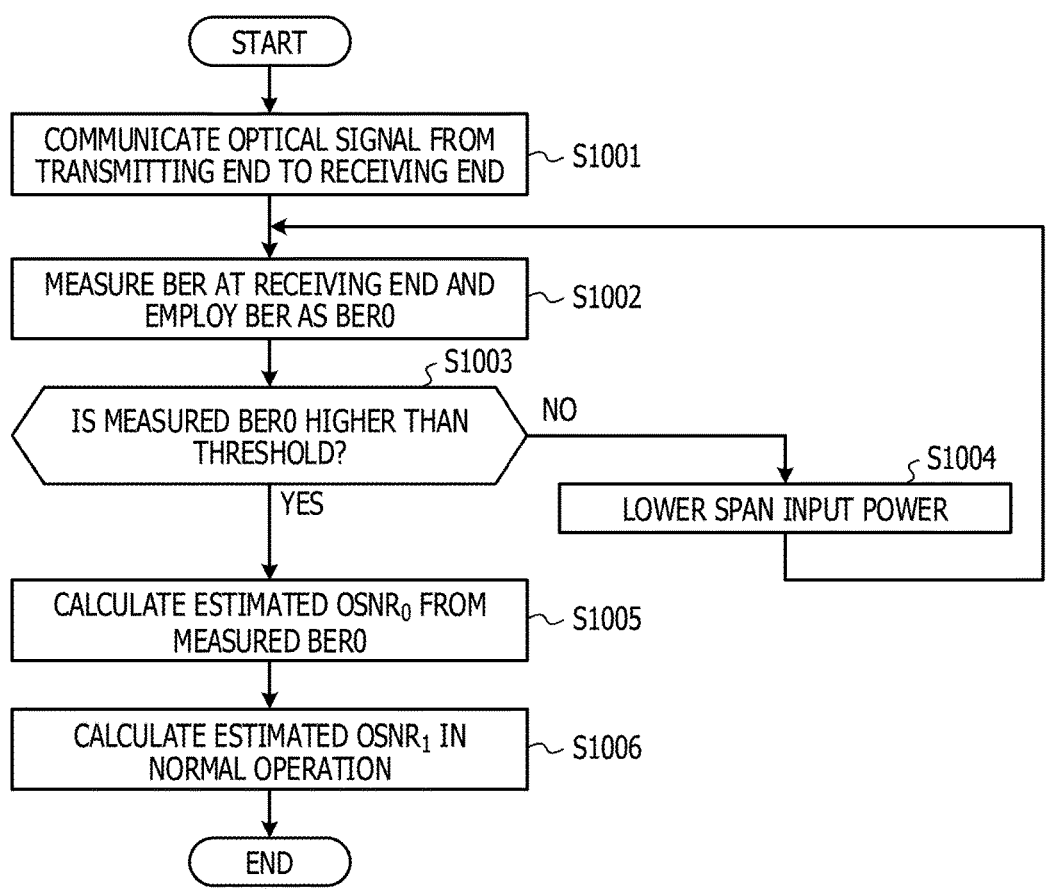
FIG. 10 is a flowchart illustrating a processing example of the first embodiment.

FIG. 10 is a flowchart illustrating a processing example in the case in which the arithmetic processing device 801 of the computer exemplified in FIG. 8 executes the above-described procedure of the first embodiment as software processing. This processing is operation in which the arithmetic processing device 801 in FIG. 8 executes an optical transmission characteristic measurement processing program of the first embodiment loaded from the auxiliary information storing device 804 or the like into the memory device 802.

First, the arithmetic processing device 801 issues an instruction to the network control device 602 in FIG. 6 through the external communication device 807 to communicate an optical signal from the transmitting end to the receiving end (in the example of FIG. 9B, from Node 1 to Node 2) (S1001).

Next, the arithmetic processing device 801 issues an instruction to the network control device 602 through the external communication device 807 to cause the BER to be measured at the receiving end (in the example of FIG. 9B, the optical receiver 614 of span 1 in Node 2) and be acquired as BER0 (S1002). This processing corresponds to the above-described procedure 1 of the first embodiment and corresponds to processing of the signal quality amount adjusting unit 703 in FIG. 7.

Next, the arithmetic processing device 801 determines whether or not the measured BER0 is higher than the given threshold (S1003). This processing corresponds to the above-described procedure 2 of the first embodiment and corresponds to processing of the BER determining unit 701 in FIG. 7.

If the determination result of S1003 is NO, the arithmetic processing device 801 executes the next processing. From the network control device 602, the arithmetic processing device 801 causes the optical splitting-insertion-optical power adjustment unit 613 in the node of the transmitting end (in the example of FIG. 9B, Node 1) to lower the input power of the optical signal at the optical transmitter 615 of the processing-target span (span 1) (S1004). Thereafter, the arithmetic processing device 801 returns to the processing of S1002 to acquire the measured BER0. As long as the determination result of S1003 is NO, the arithmetic processing device 801 repeatedly executes the processing of S1004 to lower the input power.

If the determination result of S1003 becomes YES, the arithmetic processing device 801 calculates the estimated $OSNR_0$ from the measured BER0 (S1005). This processing corresponds to the above-described procedure 3 of the first embodiment and corresponds to processing of the estimated OSNR arithmetic unit 702 in FIG. 7.

Lastly, the arithmetic processing device 801 calculates the estimated $OSNR_1$ in operation in accordance with the above-described procedure 4 of the first embodiment by using the estimated $OSNR_0$ calculated in S1005 (S1006). This processing corresponds to processing of the estimated OSNR adjusting unit 704 in FIG. 7. The arithmetic processing device 801 stores this estimated $OSNR_1$ in operation in the database 803 together with information on the span (in the example of FIG. 9B, span 1).

Figure 11:
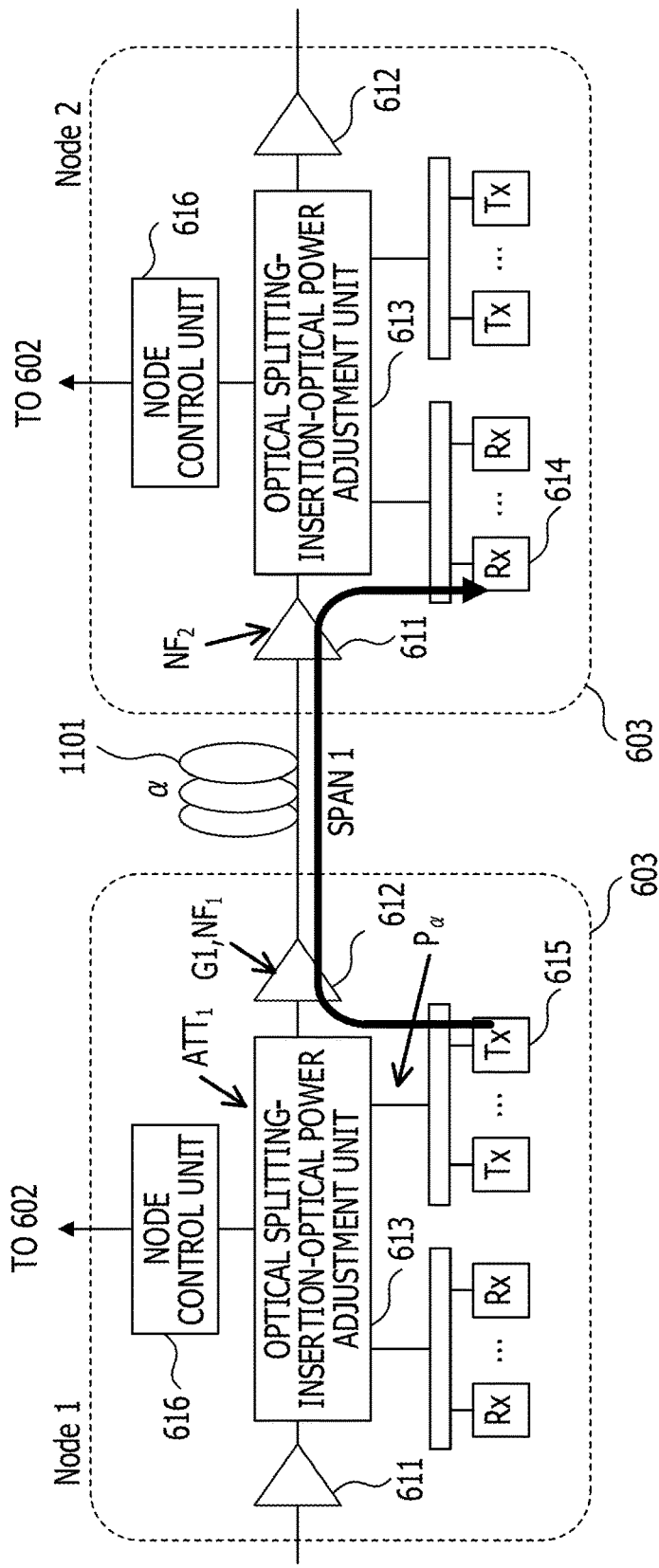
FIG. 11 is a diagram illustrating a concrete example of respective parameters in Nodes corresponding to a span.

Details of calculation processing of the estimated $OSNR_0$ and the estimated $OSNR_1$ in operation in the above-described first embodiment will be described below. FIG. 11 is a diagram illustrating a concrete example of the respective parameters in Node 1 and Node 2 corresponding to span 1 in FIG. 9B. In FIG. 11, $P_a$ is defined as input power from the optical transmitter 615 of span 1 in Node 1 to the optical splitting-insertion-optical power adjustment unit 613. $ATT_1$ is defined as the amount of attenuation in the optical splitting-insertion-optical power adjustment unit 613 of Node 1. $G_1$ is defined as the gain of the output-side optical amplifier 612 of Node 1. $NF_1$ is defined as the noise figure of the output-side optical amplifier 612 of Node 1. $\alpha$ is defined as the fiber loss of an optical fiber 1101 of span 1. $NF_2$ is defined as the noise figure of the input-side optical amplifier 611 of Node 2. h is defined as the Planck constant. v is defined as the signal frequency. $\Delta f$ is defined as the noise measurement bandwidth. By using these parameters, an estimated OSNRa at Node 1 and an estimated OSNRb at Node 2 are calculated by the following expression 8 and expression 9, respectively.

$$OSNR_a = \frac{P_a ATT_1}{NF_1 hv\Delta f} \quad \text{[Expression 8]}$$

$$OSNR_b = \frac{P_a ATT_1 G_1 \alpha}{NF_2 hv\Delta f} \quad \text{[Expression 9]}$$

From the above-described expression 8 and expression 9, the estimated $OSNR_0$ in span 1 from Node 1 toward Node 2 is calculated by the following expression 10.

$$OSNR_0 = (OSNR_a^{-1} + OSNR_b^{-1})^{-1} \quad \text{[Expression 10]}$$

$$= P_a ATT_1 \left(NF_1 hv\Delta f + \frac{NF_2 hv\Delta f}{G_1 \alpha}\right)^{-1}$$

Moreover, the estimated $OSNR_1$ in operation in span 1 from Node 1 toward Node 2 is calculated by the following expression 11. Here, $ATT_2$ is a variable amount of Node 1 in operation.

$$OSNR_1 = P_a ATT_2 \left(NF_1 hv\Delta f + \frac{NF_2 hv\Delta f}{G_1 \alpha}\right)^{-1} \quad \text{[Expression 11]}$$

$$= \frac{P_a ATT_2}{P_a ATT_1} OSNR_0$$

When being converted to an expression in decibels, expression 11 becomes the following expression 12. This expression is the same as the above-described expression 7.

$OSNR_1[dB] = OSNR_0 + (P_0 - P_1)$ $P_0 = P_a ATT_2 \quad P_1 = P_a ATT_1$ [Expression 12]

Figure 12A:
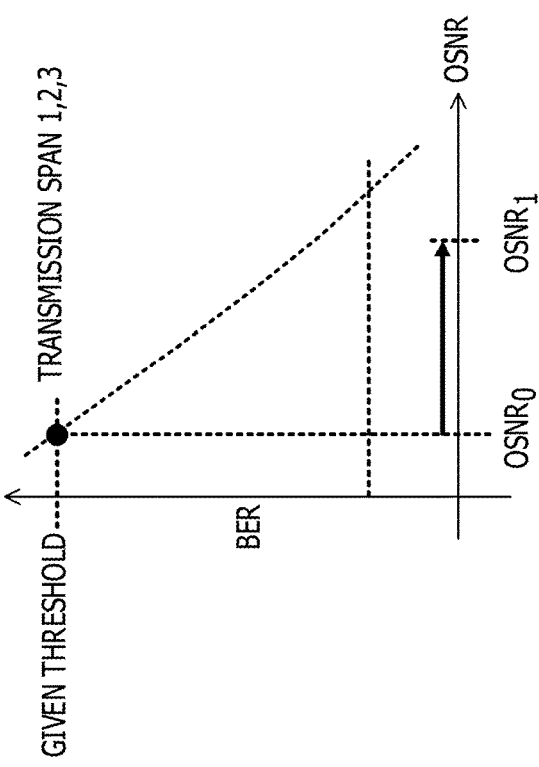
FIG. 12A and FIG. 12B are diagrams illustrating one example of the second embodiment.
Figure 12B:
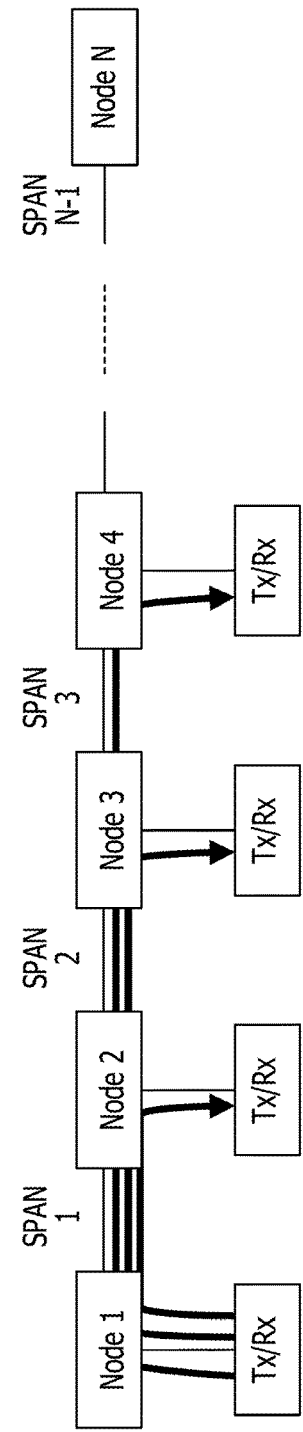

Next, the second embodiment in the system having the configuration of FIG. 6 to FIG. 8 will be described. As described above, the second embodiment is a method in which the number of spans is sequentially increased until the BER measured at the receiving end surpasses the above-described given threshold as the scheme for deteriorating the OSNR by the OSNR deterioration amount 501, described above in the explanation with FIG. 5A and FIG. 5B. FIG. 12A and FIG. 12B are diagrams illustrating one example of the second embodiment.

The procedure of the second embodiment is as follows.

Procedure 1: As illustrated in FIG. 12B, with sequential increase in the span up to span 1, span 2, and span 3, the reception BER is measured at the respective receiving end nodes (Node 2, Node 3, and Node 4). For example, an instruction is issued from the signal quality amount adjusting unit 703 in FIG. 7 to the network control device 602 and the node control unit 616 and the optical splitting-insertion-optical power adjustment unit 613 in the node 603 as Node 1 in FIG. 6. Thereby, the optical transmitter 615 corresponding to span 1 is instructed to transmit the optical signal with given input power. The network control device 602 in FIG. 6 causes the BER to be sequentially measured at the optical receivers 614 corresponding to span 1, span 2, and span 3 through the respective node control units 616 in Node 2, Node 3, and Node 4, and outputs the BER to the BER determining unit 701 in FIG. 7.

Procedure 2: As illustrated in FIG. 12A, at the timing when the BER determining unit 701 in FIG. 7 determines that the BER of the respective spans sequentially received from the network control device 602 has surpassed the given threshold, the BER determining unit 701 causes the signal quality amount adjusting unit 703 to stop the instruction to increase the number of spans. Suppose that the instruction is stopped at Node 4 in the following example.

Procedure 3: The estimated OSNR arithmetic unit 702 in FIG. 7 calculates the estimated OSNR' (see FIG. 5A) corresponding to BER=BER0 at the above-described timing and employs the estimated OSNR' as the estimated $OSNR_0$.

Procedure 4: The estimated OSNR adjusting unit 704 in FIG. 7 calculates the estimated $OSNR_1$ [dB] in operation by the following expression 13 from the estimated $OSNR_0$ calculated in the estimated OSNR arithmetic unit 702 at the above-described timing and information on the loss of each span acquired from the network control device 602.

$$OSNR_1 = \left( \frac{1}{OSRN_0} \frac{Loss_{span1}}{Loss_{total}} \right)^{-1} \quad \text{[Expression 13]}$$

In consideration of the noise figure at each Node, the estimated $OSNR_1$ [dB] in operation may be calculated by the following expression 14.

$$OSNR_1 = \left( \frac{1}{OSNR_0} \frac{\frac{Loss_1}{NF_1}}{\sum_k \frac{Loss_k}{NF_k}} \right)^{-1} \quad \text{[Expression 14]}$$

FIG. 13 is a flowchart illustrating a processing example in the case in which the arithmetic processing device 801 of the computer exemplified in FIG. 8 executes the above-described procedure of the second embodiment as software processing. This processing is operation in which the arithmetic processing device 801 in FIG. 8 executes an optical transmission characteristic measurement processing program of the second embodiment loaded from the auxiliary information storing device 804 or the like into the memory device 802.

First, the arithmetic processing device 801 issues an instruction to the network control device 602 in FIG. 6 through the external communication device 807 to communicate an optical signal from the transmitting end to the receiving end (S1301).

Next, the arithmetic processing device 801 issues an instruction to the network control device 602 through the external communication device 807 to cause the BER to be measured at the receiving end (S1302). In the example of FIG. 12B, the receiving end is the optical receiver 614 of span 1 in Node 2 at first. Thus, the arithmetic processing device 801 issues the instruction to measure the BER to the optical receiver 614 of span 1 from the network control device 602 through the node control unit 616 and the optical splitting-insertion-optical power adjustment unit 613 in Node 2. This processing corresponds to the above-described procedure 1 of the second embodiment and corresponds to processing of the signal quality amount adjusting unit 703 in FIG. 7.

Next, the arithmetic processing device 801 determines whether or not the measured BER is higher than the given threshold (S1303). This processing corresponds to the above-described procedure 2 of the second embodiment and corresponds to processing of the BER determining unit 701 in FIG. 7.

If the determination result of S1303 is NO, the arithmetic processing device 801 executes the next processing. The arithmetic processing device 801 increases the number of spans and returns to the processing of S1302. For example, the arithmetic processing device 801 issues an instruction to measure the BER to the optical receiver 614 of span 2 (see FIG. 12B) from the external communication device 807 through the network control device 602 and the node control unit 616 and the optical splitting-insertion-optical power adjustment unit 613 in Node 3. Subsequently, the arithmetic processing device 801 determines whether or not the measured BER is higher than the given threshold (S1303).

If the determination result of S1303 is NO again, the arithmetic processing device 801 further increases the number of spans and returns to the processing of S1302. For example, the arithmetic processing device 801 issues an instruction to measure the BER to the optical receiver 614 of span 3 (see FIG. 12B) from the external communication device 807 through the network control device 602 and the node control unit 616 and the optical splitting-insertion-optical power adjustment unit 613 in Node 4. Then, the arithmetic processing device 801 determines whether or not the measured BER is higher than the given threshold (S1303).

If the determination result of S1303 becomes YES, the arithmetic processing device 801 calculates the estimated $OSNR_0$ from the measured BER (S1305). This processing corresponds to the above-described procedure 3 of the second embodiment and corresponds to processing of the estimated OSNR arithmetic unit 702 in FIG. 7.

After the processing of S1305, the arithmetic processing device 801 acquires span loss information of the respective spans 1, 2, and 3 from the network control device 602 (S1306). Then, the arithmetic processing device 801 calculates the estimated $OSNR_1$ in operation by using the estimated $OSNR_0$ calculated in S1305 and the span loss information acquired in S1306 in accordance with the above-described procedure 4 of the second embodiment (S1307). This processing corresponds to processing of the estimated OSNR adjusting unit 704 in FIG. 7. The arithmetic processing device 801 stores this estimated $OSNR_1$ in operation in the database 803 together with information on the spans (in the example of FIG. 12B, span 1, span 2, and span 3).

Figure 14A:
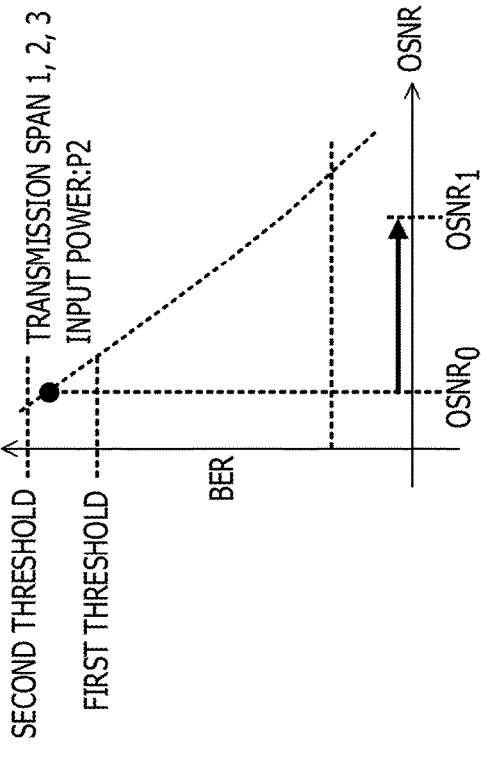
FIG. 14A and FIG. 14B are diagrams illustrating one example of the third embodiment.
Figure 14B:
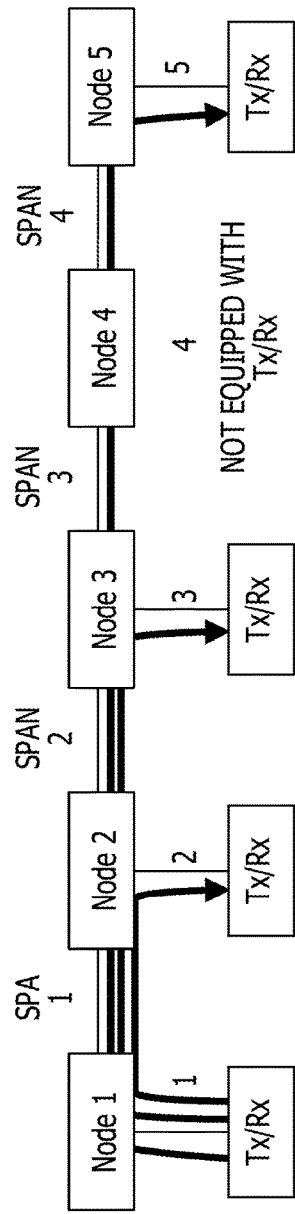

Next, the third embodiment in the system having the configuration of FIG. 6 to FIG. 8 will be described. As described above, the third embodiment is a scheme obtained by combining the first embodiment and the second embodiment. FIG. 14A and FIG. 14B are diagrams illustrating one example of the third embodiment.

Now, a case is conceivable in which the BER does not surpass the given threshold even with the minimum input power as the result of operation of the first embodiment. A case is conceivable in which, as the result of operation of the second embodiment, the BER surpasses the given threshold but a node that may measure the BER does not exist. For example, there is the following case. As in FIG. 14B, transmission is carried out with the minimum power and the BER does not surpass the threshold at Node 3. Furthermore, Node 4 is not equipped with an optical transmitter/receiver (Tx/Rx). Thus, the BER is measured at Node 5. However, the signal quality is too low to measure the BER.

The procedure of the third embodiment is as follows.

Procedure 1: The input power is set to the minimum in span 1.

Procedure 2: The number of spans is increased.

Procedure 3: It is detected that the BER surpasses the threshold at Node 5 but measuring the BER is difficult.

Procedure 4: The BER is measured at Node 5 while the input power is increased at Node 1.

Procedure 5: The increase in the input power is stopped at the timing when the BER becomes measurable (input power: P2) and the estimated $OSNR_0$ is calculated.

Procedure 6: The estimated $OSNR_1$ in operation in span 1 is calculated from the number of spans and the input power at this time by the following expression 15 and expression 16.

$$OSNR'_0 = \left(\frac{1}{OSRN_0} \frac{Loss_{span1}}{Loss_{total}}\right)^{-1} \quad \text{[Expression 15]}$$

$$OSNR_1[dB] = OSNR'_0 + (P_1 - P_2) \quad \text{[Expression 16]}$$

Figure 15:
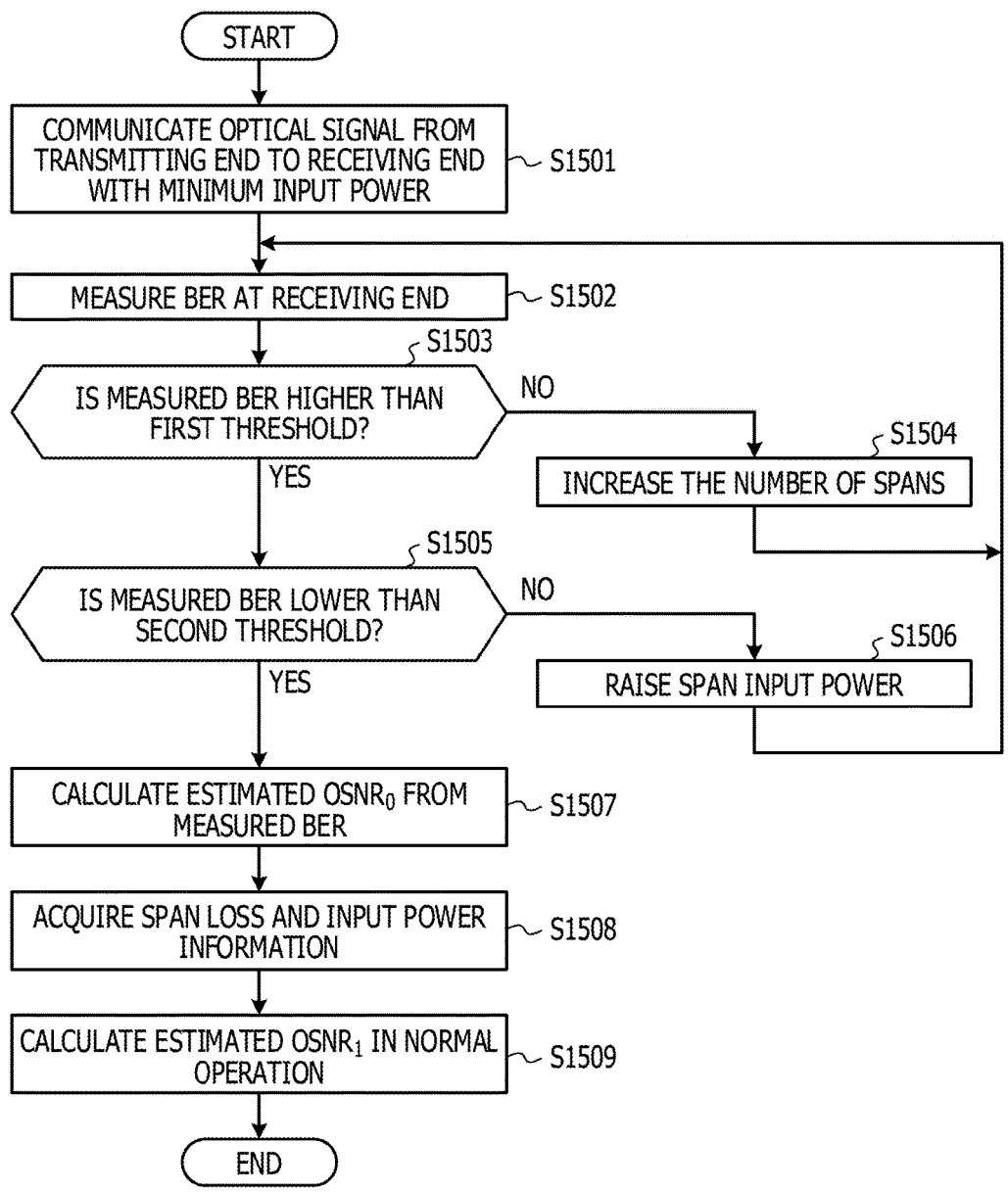
FIG. 15 is a flowchart illustrating a processing example of the third embodiment.

FIG. 15 is a flowchart illustrating a processing example in the case in which the arithmetic processing device 801 of the computer exemplified in FIG. 8 executes the above-described procedure of the third embodiment as software processing. This processing is operation in which the arithmetic processing device 801 in FIG. 8 executes an optical transmission characteristic measurement processing program of the third embodiment loaded from the auxiliary information storing device 804 or the like into the memory device 802.

First, the arithmetic processing device 801 issues an instruction to the network control device 602 in FIG. 6 through the external communication device 807 to communicate an optical signal from the transmitting end to the receiving end, with the input power set to the minimum (S1501). This processing corresponds to the above-described procedure 1 of the third embodiment.

Next, the arithmetic processing device 801 issues an instruction to the network control device 602 through the external communication device 807 to cause the BER to be measured at the receiving end (S1502). In the example of FIG. 14B, the receiving end is the optical receiver 614 of span 1 in Node 2 at first. Thus, the arithmetic processing device 801 issues the instruction to measure the BER to the optical receiver 614 of span 1 from the network control device 602 through the node control unit 616 and the optical splitting-insertion-optical power adjustment unit 613 in Node 2. This processing corresponds to the above-described procedure 2 of the third embodiment and corresponds to processing of the signal quality amount adjusting unit 703 in FIG. 7.

Next, the arithmetic processing device 801 determines whether or not the measured BER is higher than a first threshold as illustrated in FIG. 14A (S1503). This processing corresponds to processing of the BER determining unit 701 in FIG. 7.

If the determination result of S1503 is NO, the arithmetic processing device 801 sequentially increases the number of spans until the determination result of S1503 becomes YES similarly to S1304 in FIG. 13 in the second embodiment (S1504). This processing corresponds to the above-described procedure 2 of the third embodiment and corresponds to processing of the signal quality amount adjusting unit 703 in FIG. 7.

As a result, the determination result of S1503 becomes YES regarding the BER measured at Node 5 after the span is increased up to span 4 in FIG. 14B, for example.

After the determination result of S1503 becomes YES, the arithmetic processing device 801 determines whether or not the measured BER is lower than a second threshold larger than the first threshold as illustrated in FIG. 14A (S1505). This processing corresponds to the above-described procedure 3 of the third embodiment and corresponds to processing of the BER determining unit 701 in FIG. 7.

If the value of the BER is bad and the determination result of S1505 is NO, the arithmetic processing device 801 executes the next processing. The arithmetic processing device 801 causes the optical splitting-insertion-optical power adjustment unit 613 in the node of the transmitting end (in the example of FIG. 14B, Node 1) to raise the input power of the optical signal in the optical transmitter 615 of the processing-target span (span 1, 2, 3, or 4) from the network control device 602 (S1506). Thereafter, the arithmetic processing device 801 returns to the processing of S1502. As long as the determination result of S1505 becomes NO, the arithmetic processing device 801 repeatedly executes the processing of S1506. This processing corresponds to the above-described procedure 4 of the third embodiment and corresponds to processing of the signal quality amount adjusting unit 703 in FIG. 7.

If the determination result of S1505 becomes YES in due course, the arithmetic processing device 801 calculates the estimated $OSNR_0$ from the measured BER (S1507). This processing corresponds to the above-described procedure 5 of the third embodiment and corresponds to processing of the estimated OSNR arithmetic unit 702 in FIG. 7.

After the processing of S1507, the arithmetic processing device 801 acquires span loss information of the respective spans 1, 2, 3, and 4 and input power information from the network control device 602 (S1508). Then, the arithmetic processing device 801 calculates the estimated $OSNR_1$ in operation in accordance with the above-described procedure 6 of the third embodiment by using the estimated $OSNR_0$ calculated in S1507 and the span loss information and the input power information acquired in S1508. This processing corresponds to processing of the estimated OSNR adjusting unit 704 in FIG. 7. The arithmetic processing device 801 stores this estimated $OSNR_1$ in operation in the database 803 together with information on the spans (in the example of FIG. 14B, span 1, span 2, span 3, and span 4).

Figure 16:
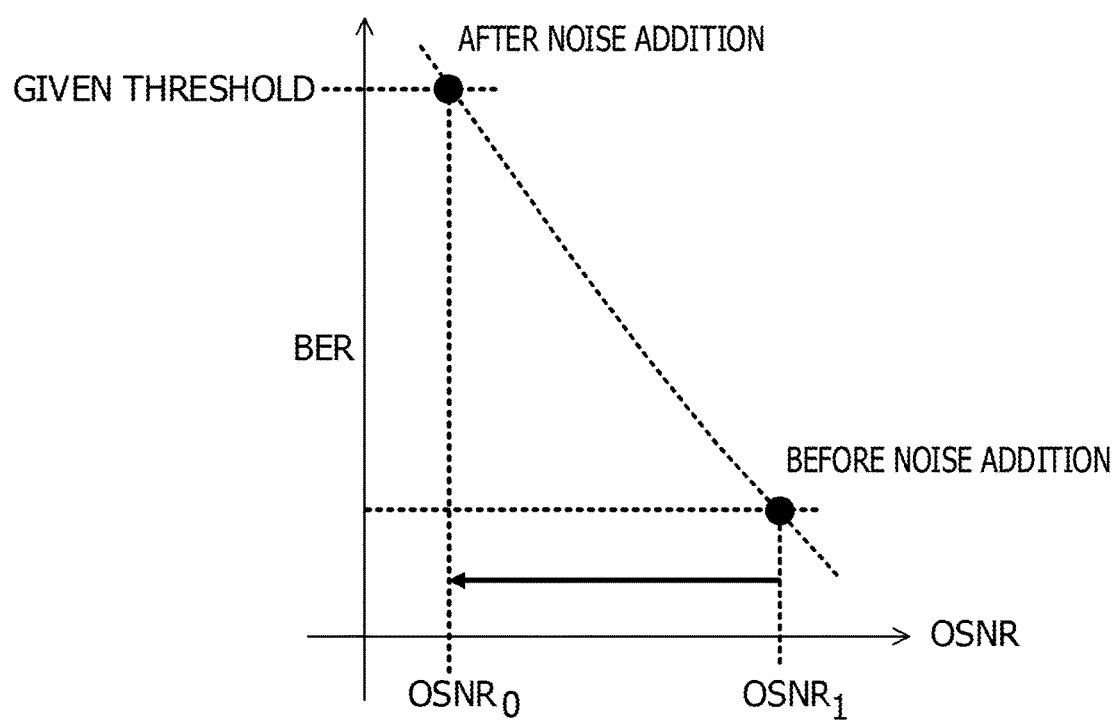
FIG. 16 is a diagram illustrating one example of the fourth embodiment.

Lastly, the fourth embodiment in the system having the configuration of FIG. 6 to FIG. 8 will be described. As described above, in the fourth embodiment, noise is added to the receiving end. FIG. 16 is a diagram illustrating one example of the fourth embodiment. The procedure of the fourth embodiment is as follows.

Procedure 1: Noise is added before an error correction unit in the optical receiver 614 of the receiving end of a span.

Procedure 2: Noise is increased up to a given threshold.

Procedure 3: The estimated $OSNR_0$ at the timing is calculated.

Procedure 4: The original estimated $OSNR_1$ is calculated from a noise addition amount Noise known at the optical receiver 614 based on the following expression 17.

$$OSNR_1 = (OSNR_0^{-1} - Noise)^{-1} \quad \text{[Expression 17]}$$

Figure 17:
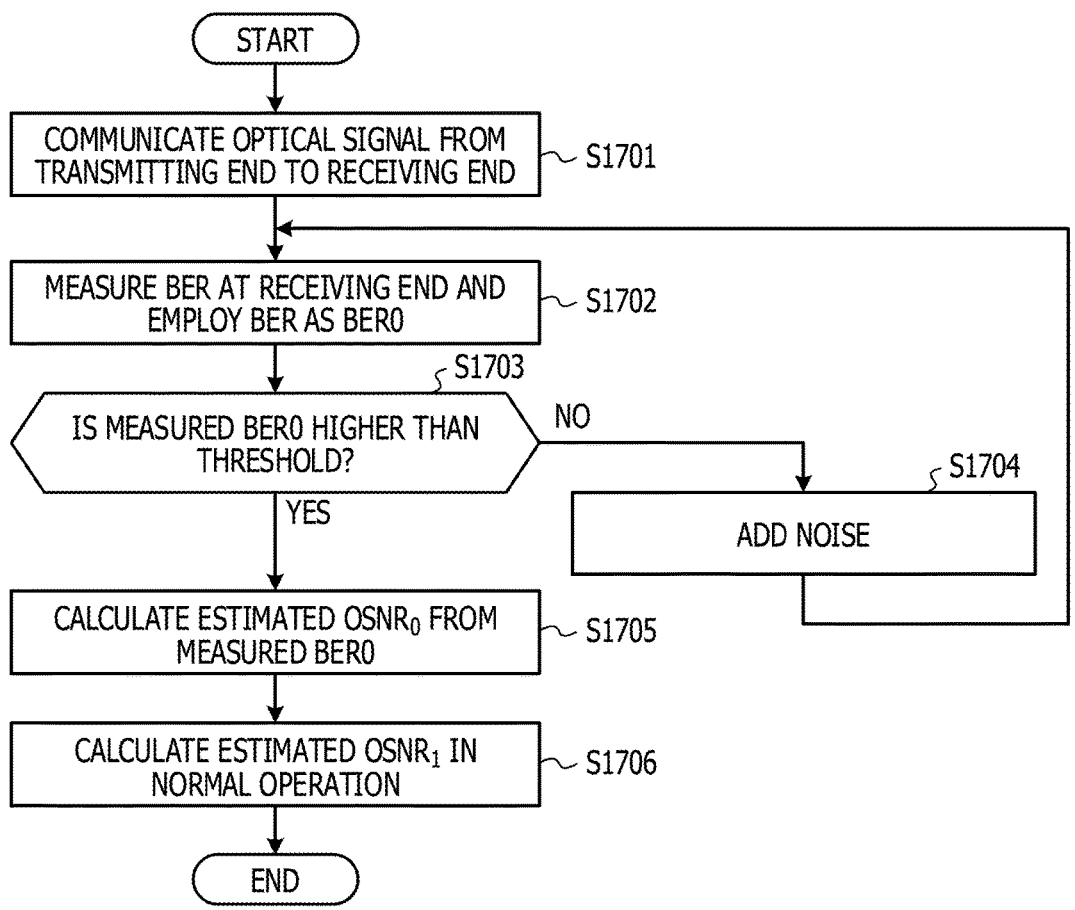
FIG. 17 is a flowchart illustrating a processing example of the fourth embodiment.

FIG. 17 is a flowchart illustrating a processing example in the case in which the arithmetic processing device 801 of the computer exemplified in FIG. 8 executes the above-described procedure of the fourth embodiment as software processing. This processing is operation in which the arithmetic processing device 801 in FIG. 8 executes an optical transmission characteristic measurement processing program of the fourth embodiment loaded from the auxiliary information storing device 804 or the like into the memory device 802.

First, the arithmetic processing device 801 issues an instruction to the network control device 602 in FIG. 6 through the external communication device 807 to communicate an optical signal from the transmitting end to the receiving end (S1701).

Next, the arithmetic processing device 801 issues an instruction to the network control device 602 through the external communication device 807 to cause the BER to be measured at the receiving end and be acquired as BER0 (S1702).

Next, the arithmetic processing device 801 determines whether or not the measured BER0 is higher than the given threshold (S1703). This processing corresponds to processing of the BER determining unit 701 in FIG. 7.

If the determination result of S1703 is NO, the arithmetic processing device 801 executes the next processing. The arithmetic processing device 801 causes noise to be added before the error correction unit, which is not particularly diagrammatically represented, in the optical receiver 614 of the processing-target span from the network control device 602 through the optical splitting-insertion-optical power adjustment unit 613 in the node of the receiving end (S1704). Thereafter, the arithmetic processing device 801 returns to the processing of S1702 to acquire the measured BER0. As long as the determination result of S1703 is NO, the arithmetic processing device 801 repeatedly executes the processing of causing noise to be added in S1704. This processing corresponds to the above-described procedure 2 of the fourth embodiment and corresponds to processing of the signal quality amount adjusting unit 703 in FIG. 7.

If the determination result of S1703 becomes YES, the arithmetic processing device 801 calculates the estimated OSNR$_0$ from the measured BER0 (S1705). This processing corresponds to the above-described procedure 3 of the fourth embodiment and corresponds to processing of the estimated OSNR arithmetic unit 702 in FIG. 7.

Lastly, the arithmetic processing device 801 calculates the estimated OSNR$_1$ in operation in accordance with the above-described procedure 4 of the fourth embodiment by using the estimated OSNR$_0$ calculated in S1705 (S1706). This processing corresponds to processing of the estimated OSNR adjusting unit 704 in FIG. 7. The arithmetic processing device 801 stores this estimated OSNR$_1$ in operation in the database 803 together with information on the span.

By the embodiments described above, it becomes possible to reduce an error that arises between the real OSNR at the time of real operation and an estimated OSNR at the time of measurement of optical transmission characteristics due to variation in characteristics of an optical transmission device and it becomes possible to design an optical transmission system with higher performance.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical transmission characteristic measurement method executed by a processor included in an optical transmission characteristic measurement device coupled to a plurality of nodes, the optical transmission characteristic measurement method comprising:
   starting transmission of an optical signal from a transmitting node to a receiving node in the plurality of nodes;
   receiving a bit error rate value that is measured by the receiving node and relates to the optical signal;
   determining whether the bit error rate value is higher than a given threshold;
   adjusting input power of the optical signal to lower the input power until it is determined that the bit error rate value is higher than the given threshold when it is determined that the bit error rate value is not higher than the given threshold;
   estimating an optical signal to noise ratio from the bit error rate value when it is determined that the bit error rate value is higher than the given threshold; and
   calculating an optical signal to noise ratio based on the estimated optical signal to noise ratio and an amount of lowering of the input power.

2. The optical transmission characteristic measurement method according to claim 1, wherein
   the adjusting includes adjusting the input power in such a manner as to sequentially decrease the input power from the input power of a first timing that is an operation timing,
   the estimating includes estimating the optical signal to noise ratio from the bit error rate value of a second timing when the bit error rate value has surpassed the given threshold, and
   the calculating includes calculating an optical signal to noise ratio of the first timing from the optical signal to noise ratio estimated at the second timing, the input power at the second timing, and the input power of the first timing.

3. The optical transmission characteristic measurement method according to claim 1, wherein
   the adjusting includes adjusting the number of spans that link two nodes in such a manner as to sequentially increase the number of spans from one,
   the receiving includes receiving the bit error rate value measured at the receiving node decided according to the number of spans regarding each of the numbers of spans,
   the estimating includes estimating the optical signal to noise ratio from the bit error rate value of a timing when the bit error rate value has surpassed the given threshold, and
   the calculating includes calculating an optical signal to noise ratio of an operation timing from the optical signal to noise ratio estimated at the timing and information on optical transmission loss of each span corresponding to the number of spans at the timing when the bit error rate value has surpassed the given threshold.

4. The optical transmission characteristic measurement method according to claim 1, wherein
   the adjusting includes adjusting the number of spans that link two nodes in such a manner as to sequentially increase the number of spans from one after setting the input power to minimum input power,
   the adjusting includes adjusting the input power in such a manner as to sequentially increase the input power from the minimum input power of the optical signal after a third timing when the bit error rate value has surpassed a first threshold and until the bit error rate value falls below a second threshold, the estimating includes estimating the optical signal to noise ratio from the bit error rate value of a fourth timing when the bit error rate value has fallen below the second threshold, and the calculating includes calculating an optical signal to noise ratio of the fourth timing from the optical signal to noise ratio estimated at the fourth timing, information on optical transmission loss of each span corresponding to the number of spans at the fourth timing, the input power of the optical signal at the fourth timing, and the input power of the optical signal of the third timing.

5. The optical transmission characteristic measurement method according to claim 4,
wherein the adjusting the number of spans includes increasing the number of spans when it is determined that the bit error rate value is equal to or smaller than the first threshold.

6. The optical transmission characteristic measurement method according to claim 5,
wherein the adjusting the input power includes increasing the input power when it is determined that the bit error rate value does not fall below the second threshold.

7. The optical transmission characteristic measurement method according to claim 1,
wherein the calculating includes calculating an optical signal to noise ratio of an optical wavelength path of an estimation target based on the optical signal to noise ratio calculated regarding each of spans that link two nodes.

8. The optical transmission characteristic measurement method according to claim 7, further comprising:
determining propriety of transmission of the optical wavelength path from the optical signal to noise ratio of the optical wavelength path and a threshold of the optical signal to noise ratio set in advance.

9. An optical transmission characteristic measurement device coupled to a plurality of nodes, the optical transmission characteristic measurement device comprising:
a memory; and
a processor coupled to the memory and configured to:
start transmission of an optical signal from a transmitting node to a receiving node in the plurality of nodes,
acquire a bit error rate value that is measured by the receiving node and relates to the optical signal,
determine whether the bit error rate value is higher than a given threshold,
adjust input power of the optical signal to lower the input power until it is determined that the bit error rate value is higher than the given threshold when it is determined that the bit error rate value is not higher than the given threshold,
estimate an optical signal to noise ratio from the bit error rate value when it is determined that the bit error rate value is higher than the given threshold, and
calculate an optical signal to noise ratio based on the estimated optical signal to noise ratio and an amount of lowering of the input power.

10. The optical transmission characteristic measurement device according to claim 9, wherein the processor is configured to:

adjust the input power in such a manner as to sequentially decrease the input power from the input power of a first timing that is an operation timing,
estimate the optical signal to noise ratio from the bit error rate value of a second timing when the bit error rate value has surpassed the given threshold, and
calculate an optical signal to noise ratio of the first timing from the optical signal to noise ratio estimated at the second timing, the input power at the second timing, and the input power of the first timing.

11. The optical transmission characteristic measurement device according to claim 9, wherein the processor is configured to:
adjust the number of spans that link two nodes in such a manner as to sequentially increase the number of spans from one,
receive the bit error rate value measured at the receiving node decided according to the number of spans regarding each of the numbers of spans,
estimate the optical signal to noise ratio from the bit error rate value of a timing when the bit error rate value has surpassed the given threshold, and
calculate an optical signal to noise ratio of an operation timing from the optical signal to noise ratio estimated at the timing and information on optical transmission loss of each span corresponding to the number of spans at the timing when the bit error rate value has surpassed the given threshold.

12. The optical transmission characteristic measurement device according to claim 9, wherein the processor is configured to:
adjust the number of spans that link two nodes in such a manner as to sequentially increase the number of spans from one after setting the input power to minimum input power,
adjust the input power in such a manner as to sequentially increase the input power from the minimum input power of the optical signal after a third timing when the bit error rate value has surpassed a first threshold and until the bit error rate value falls below a second threshold,
estimate the optical signal to noise ratio from the bit error rate value of a fourth timing when the bit error rate value has fallen below the second threshold, and
calculate an optical signal to noise ratio of the fourth timing from the optical signal to noise ratio estimated at the fourth timing, information on optical transmission loss of each span corresponding to the number of spans at the fourth timing, the input power of the optical signal at the fourth timing, and the input power of the optical signal of the third timing.

13. The optical transmission characteristic measurement device according to claim 12,
wherein the adjusting the number of spans includes increasing the number of spans when it is determined that the bit error rate value is equal to or smaller than the first threshold.

14. The optical transmission characteristic measurement device according to claim 13,
wherein the adjusting the input power includes increasing the input power when it is determined that the bit error rate value does not fall below the second threshold.

* * * * *